(12) United States Patent
Tan et al.

(10) Patent No.: US 6,462,788 B1
(45) Date of Patent: Oct. 8, 2002

(54) METHOD AND SYSTEM FOR REMOVING COLOR BLEEDING ARTIFACTS BY FILTERING THE CHROMINANCE PLANE OF DECOMPRESSED IMAGES

(75) Inventors: Yap Peng Tan; Wenjun Zeng; Shawmin Lei, all of Vancouver, WA (US)

(73) Assignee: Sharp Laboratories of America, Camas, WA (US)

(*) Notice: Subject to any disclaimer, the term of this patent is extended or adjusted under 35 U.S.C. 154(b) by 323 days.

(21) Appl. No.: 09/584,333

(22) Filed: May 30, 2000

(51) Int. Cl.[7] .................................................. H04N 5/21
(52) U.S. Cl. ........................ 348/624; 348/630; 348/631
(58) Field of Search ................................ 348/624, 630, 348/631; 382/266; H04N 5/21

(56) References Cited

U.S. PATENT DOCUMENTS

| | | | |
|---|---|---|---|
| 4,994,906 A | * | 2/1991 | Moriwake .................... 348/610 |
| 5,047,844 A | | 9/1991 | Ikeda et al. |
| 5,119,187 A | | 6/1992 | Ikeda et al. |
| 5,270,807 A | | 12/1993 | Ikeda et al. |
| 5,712,687 A | * | 1/1998 | Naveen et al. ............... 348/441 |
| 5,757,670 A | | 5/1998 | Ti et al. |
| 5,796,875 A | | 8/1998 | Read |
| 5,881,180 A | | 3/1999 | Chang et al. |
| 5,933,542 A | | 8/1999 | Chang et al. |
| 5,974,196 A | | 10/1999 | Chang et al. |
| 6,031,581 A | * | 2/2000 | Harrington ................... 348/630 |

OTHER PUBLICATIONS

"A Postprocessing Method for Reducing Quantization Effects in Low Bit–Rate Moving Picture Coding," by Hyun Wook Park and Yung Lyul Lee, 1051–8215/99, ®1999 IEEE, IEEE Transactions On Circuits and Systems for Video Technology, vol. 9, No. 1, Feb. 1999.

"Adaptive Postprocessor for Block Encoded Images," Chung J. Kuo and Ruey J. Hsieh, 1051–8215/95, ®1995 IEEE, IEEE Transactions On Circuits and Systems for Video Technology, vol. 5, No. 4, Aug. 1995.

"Adaptive Postprocessing Algorithms for Low Bit Rate Video Signals," by Tsann–Shyong Liu and Nikil Jayant, 1057–7149/95, ®1995 IEEE, IEEE Transactions On Image Processing, vol. 4, No. 7, Jul. 1995.

"De–blocking DCT compressed Images," by Albert J. Ahumada, Jr., and Rensheng Horng, 0–8194–1474–3/94, SPIE vol. 2179/109.

* cited by examiner

*Primary Examiner*—Sherrie Hsia
(74) *Attorney, Agent, or Firm*—Marger Johnson & McCollum, PC

(57) ABSTRACT

A video frame is decomposed into blocks of pixels. Blocks that contain moving edges are not processed further. The remaining blocks are examined for the likelihood of having color bleeding artifacts, and not processed further if the likelihood is low. The likelihood is determined by examining statistics of the chrominance values. The remaining blocks are de-color bleeding filtered at the chrominance plane, without affecting the corresponding luminance plane.

22 Claims, 2 Drawing Sheets

METHOD AND SYSTEM FOR REMOVING COLOR BLEEDING ARTIFACTS BY FILTERING THE CHROMINANCE PLANE OF DECOMPRESSED IMAGES

BACKGROUND OF THE INVENTION

1. Field of the Invention

The present invention is related to the field of digital image processing, and more specifically to processing of a decompressed digital image to remove color bleeding artifacts by filtering at the chrominance plane.

2. Description of the Related Art

When images are stored in arrays of pixels, each pixel stores a small portion of an image, in the form of image data. The same is true for both static images (such as photographs), and for video sequences.

The large volume of image data slows down its transmission. To alleviate the problem, compression techniques are used to reduce the amount of data. The image is afterwards decompressed and reconstructed.

A problem arises when a high compression technique is used with insufficient bit rate of transmission. When the image is reconstructed, it includes visual noise. The noise is the appearance of artifacts, such as color bleeding artifacts and ringing artifacts.

Color bleeding artifacts appear as color of one region smearing (or "bleeding") onto a neighboring region. These artifacts appear in areas where large quantization errors were introduced by the initial compression. This happens where compression was difficult, such as scenes with a lot of motion and/or high spatial frequency contents.

Artifacts are usually removed by post processing of the decompressed image. Algorithms process the image data, to produce a processed image. Such algorithms have limitations. Unlike with ringing artifacts, intensive processing is required to remove color bleeding artifacts. If the data is overprocessed, however, then the image information starts being oversmoothed, which detracts from the overall image quality.

BRIEF SUMMARY OF THE INVENTION

The present invention overcomes these problems and limitations of the prior art. The present invention notices that color bleeding artifacts become perceptually objectionable when the bleeding color has a color hue different from its surrounding area. The invention emphasizes more aggressive filtering at the chrominance plane than at the luminance plane, for eliminating the objectionable effect of color bleeding. The invention works well because the human eye is less sensitive to the details of the chrominance information than to those of the luminance information.

Generally, the present invention provides a method and a system for processing a decompressed video image. A video frame is decomposed into groups of pixels, such as blocks. Blocks that contain moving edges are preferably not processed further. The remaining blocks are preferably examined for the likelihood of having color bleeding artifacts, and not processed further if the likelihood is low. The remaining blocks are de-color bleeding filtered at the chrominance plane, without affecting the luminance plane.

The invention thus removes color bleeding artifacts, while not sacrificing much image information (which is mostly stored in the luminance component). The invention is additionally computationally fast. Since it obviates the need for over applying other, computationally intense post processing techniques, the invention becomes a prime choice for image post processing after decompression.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides methods and systems for processing a decompressed image. In all aspects, the invention exploits the fact that the chrominance planes of most general video sequences are highly correlated in both spatial and temporal domains. In other words, local video content tends to be of smooth color variation, both in space and in time. The only exception tends to be if the image is moving quickly. The inventors discovered that in compressed video frame, regions with large chrominance variations (except those containing moving edges or moving boundaries) are likely due to the results of quantization errors. Such errors normally lead to objectionable color bleeding artifacts.

Figure 1:
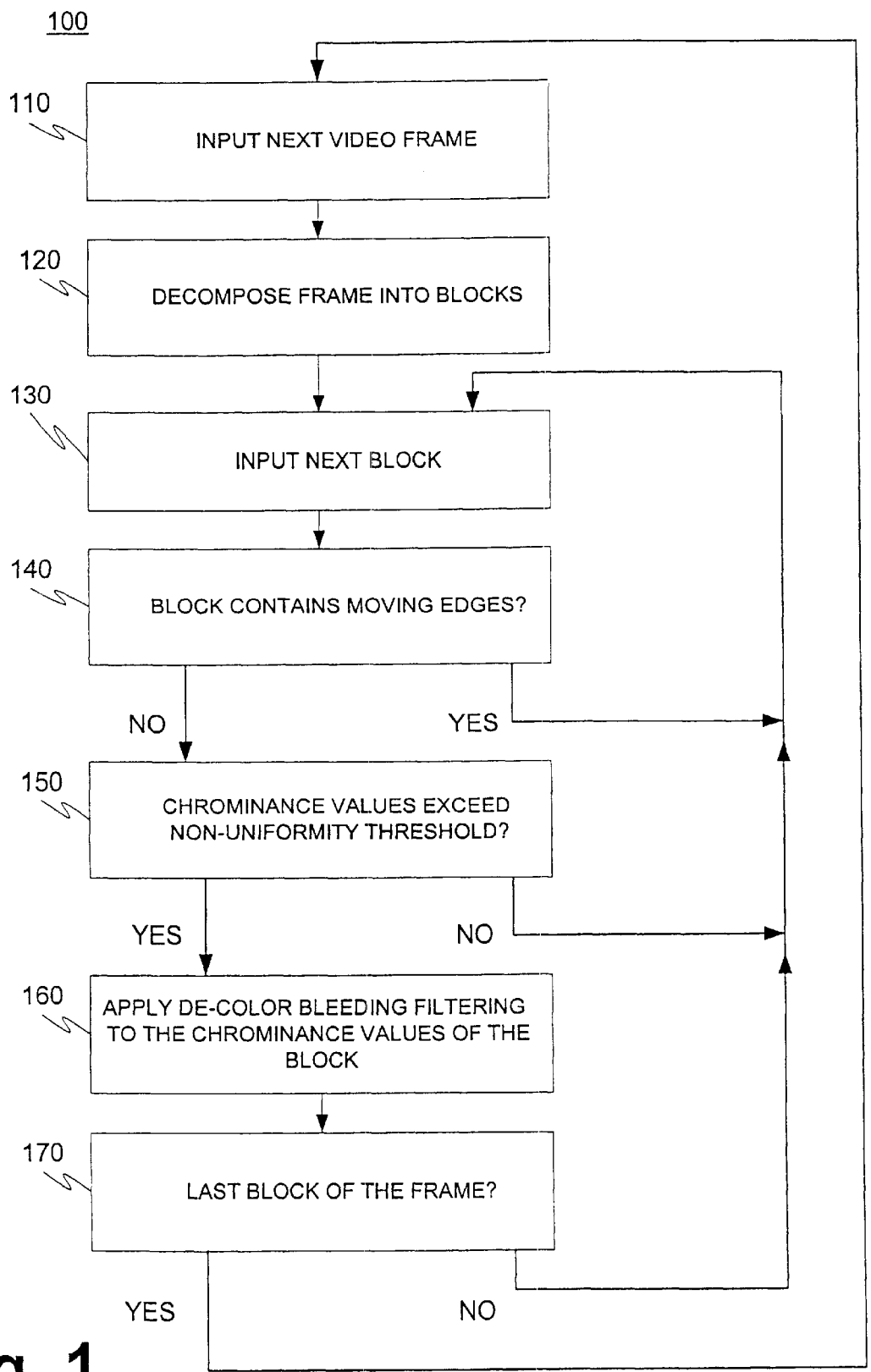
FIG. 1 is a flowchart illustrating a method according to the invention.

Referring now to FIG. 1, a flowchart 100 is used to describe the preferred embodiment of the invention.

According to a box 110, a next video frame is input. It can be a video frame of a sequence. The video frame can be a general MPEG video frame, such as an MPEG2 video frame. The video frame has an image encoded. The video frame is really a collection of pixels, each of which is associated with image data.

According to a box 120, the image is decomposed into blocks. The blocks must be large enough to encompass a complete color artifact (and thus its edges would show variation at the chrominance plane), but concurrently small enough to not temper the true color information of the overall image. It has been found that a block size of 8×8 pixels works well. This description can be equivalently extended to blocks of other sizes. Decomposition can be actual, with each block shipped separately, or merely nominal, such as by designation.

According to a box 130, a next block is input, or selected, for processing. In general, a plurality of pixels is selected from the video frame. The selected pixels contain image data that represent at least a portion of the image. It is preferred that one block is selected at a time. If the subsequent de-color bleeding filtering were applied to whole chrominance planes, then that would reduce color saturation, and also possibly eliminate small color details.

According to a box 140, it is optionally and preferably determined whether the image portion is moving. If so, then execution continues with box 130, for the next block. Determining movement of the image portion can be accomplished by detecting dominant edges in luminance values of the image data, and determining if the detected dominant edges are moving. The associated macroblock motion vectors can also be used for the determination. It will be appreciated that much of this determination can take place elsewhere in image post processing. Proper coordination of these operations can thus reduce the computational cost.

According to a box 150, it is determined whether the chrominance values meet at least one non-uniformity threshold condition. If they do not, then execution returns again to box 130. In other words, the subsequent de-color bleeding filtering is performed only if the threshold condition is met. If the threshold condition is not met, it is inferred that there are probably no color bleeding artifacts. The threshold condition is adjusted to not be met by usual color variations of the image portion, but to be met if the large variations of color bleeding artifacts are present.

The preferred non-uniformity threshold condition is as follows. First an adjacent neighbor statistic of the chrominance values is computed. Then a remote neighbor statistic of the chrominance values is computed. A non-uniformity threshold condition can be that either statistic be larger than a threshold. Another non-uniformity threshold condition can be that the adjacent neighbor statistic is larger than a preset fraction of the remote neighbor statistic.

Additionally, a chrominance block with a large inter-field difference usually contains artificial horizontal edges. So, if the Discrete Cosine Transform (DCT) coefficients of the encoded chrominance block are available, or can be recomputed in post-processing, these color bleeding blocks can also be detected by examining the magnitudes of their DCT coefficients at high horizontal frequencies. Therefore, it is preferred that both the adjacent neighbor statistic and the remote neighbor statistic are computed for image data of pixels neighboring only in a vertical direction.

An examples of computations follows. The example assumes an 8×8 block, with chrominance values of a pixel (i,j) being $x_{i,j}$. As such, each of i, j receive integer values between 0 and 7. The first index is from the row, and the second from the column.

An adjacent neighbor statistic can be computed for some of the pixels from Equation (1) below.

$$s_j = \frac{1}{4} \sum_{i=0,2,4,6} (x_{i,j} - x_{i+1,j}) + \frac{1}{3} \sum_{i=2,4,6} (x_{i,j} - x_{i-1,j})$$ Equation (1)

The adjacent neighbor statistic of each pixel of Equation (1) can be used to compute an aggregate adjacent neighbor statistic by Equation (2) below.

$$S = \text{abs}\left(\sum_j s_j\right)$$ Equation (2)

A remote neighbor statistic can be computed for some of the pixels from Equation (3) below.

$$r_j = \frac{1}{3} \sum_{i=0,3,4} (x_{i,j} - x_{i+2,j}) + \frac{1}{3} \sum_{i=3,4,7} (x_{i,j} - x_{i-2,j})$$ Equation (3)

The remote neighbor statistic of each pixel of Equation (3) can be used to compute an aggregate remote neighbor statistic by Equation (4) below.

$$R = \text{abs}\left(\sum_j r_j\right)$$ Equation (4)

A first non-uniformity condition can be that:

$$S > S_{THR}$$ Equation (5)

It has been found that a good value for $S_{THR}$ that works well is 20.

A second non-uniformity condition can be that:

$$S > f \cdot R$$ Equation (6)

It has been found that a value for the fraction f that works well is 0.7. In the preferred embodiment, both conditions of Equations (5) and (6) must be met. If not, this block is not processed by the subsequent de-color bleeding filtering.

Then, according to a box 160, the chrominance values of the image data are de-color bleeding filtered. Accordingly, the chrominance values are preferably filtered differently than the respective luminance values of the image data.

A number of ways can be devised for filtering the chrominance values. The preferred method includes determining a representative chrominance statistic from at least some of the chrominance values.

It is preferred that the chrominance statistic is the median, and that adaptive median filtering is applied. This is preferred because it can effectively remove outlier color, while better preserving true color boundaries. It is preferred that the median is extracted from those of the selected chrominance values (i.e. the chrominance values of the block) that are encompassed by a mask. A mask thus defines an m×n local region for each chrominance value. Suitable values for the mask are 5×3, 7×1. Accordingly, the median chrominance for each pixel is given by Equation (7).

$$I_m^c(i, j) = \underset{\substack{i-\lfloor m/2 \rfloor \leq r \leq i+\lfloor m/2 \rfloor \\ j-\lfloor n/2 \rfloor \leq s \leq j+\lfloor n/2 \rfloor}}{\text{median}} \{I^c(r, s)\}$$ Equation (7)

In Equation (7), C can be used for either one or both of the chrominance values, namely Cr and Cb.

Then a difference is computed of at least one (also known as "a queried one") of the chrominance values from the determined chrominance statistic. It is preferred that the difference is computed for all the chrominance values, such as from Equation (8).

$$\Delta(i,j) = |I^c(i,j) - I_m^c(i,j)|$$ Equation (8)

A key part of this filtering is to compare the difference computed in Equation (8) with a preset threshold discrepancy. This can be accomplished according to Equation (9).

$$\Delta(i,j) > T_{CB}$$ Equation (9)

Then, if Equation (9) is true, the queried chrominance value is replaced. Preferably it is replaced with the median computed in Equation (7).

Then, according to a box 170, it is inquired whether this was the last block of the frame. If not, then execution proceeds to box 130. If yes, the execution returns to box 110 for inputting the next frame.

As already mentioned above, the invention also provides systems. It is readily apparent that the present invention can be implemented in a dedicated circuit (as in FIG. 2), or in a dedicated processor system (as in FIG. 3).

Figure 2:
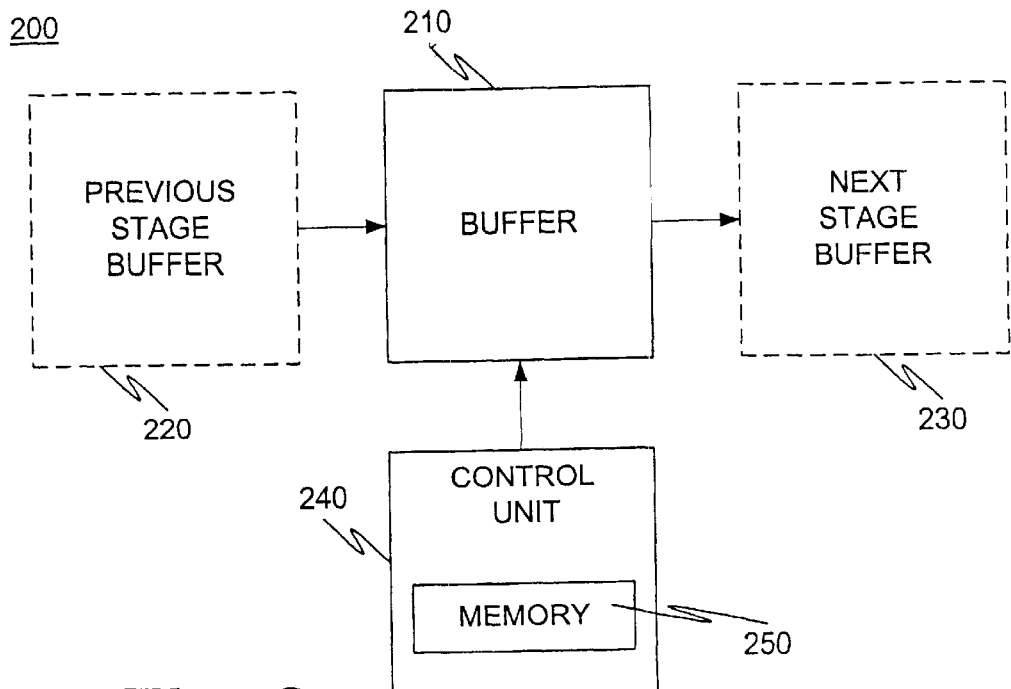
FIG. 2 is a block diagram of a system according to the invention.

Referring now to FIG. 2, a system 200 of the invention is described.

System 200 includes a buffer 210 for receiving image data representing at least a portion of an image. The buffer 210 can be a buffer for a whole frame, or just a block.

Buffer 210 is shown as receiving data from a previous stage buffer 220, and as outputting its data to a next stage buffer 230. This succession of buffers is shown this way to better illustrate the invention, as part of a chain, and preferably at post processing. Equivalently, buffer 210 can be combined with either one or both of buffers 220, 230. Alternately, buffer 210 can be implemented by a series of buffers, for the various processing stages of the invention. Such a series could ultimately end in an output multiplexer.

System 200 also includes a control unit 240 coupled with the buffer 210. The control unit 240 includes a memory 250. The control unit operates on the image data stored in buffer 210, for performing the method of the invention.

In one embodiment, the control unit 240 is for determining whether the image portion is moving and, if not, for de-color bleeding filtering chrominance values of the image data differently than respective luminance values of the image data. It is preferred that the control unit is further for determining whether the chrominance values meet at least one non-uniformity threshold condition, and for de-color bleeding filtering the chrominance values only if the non-uniformity threshold condition is met. The preferred non-uniformity threshold condition is that an adjacent neighbor statistic of the chrominance values is larger than a preset fraction of a remote neighbor statistic of the chrominance values. These statistics are preferably for image data of pixels neighboring only in a vertical direction.

Preferably, the control unit is for de-color bleeding filtering the chrominance values by determining a representative chrominance statistic from at least some of the chrominance values, determining a difference of a queried one of the chrominance values from the determined statistic, and for replacing the queried chrominance value if the determined difference is larger than a preset threshold discrepancy. The preferred statistic is the median of those of the selected chrominance values that are encompassed by a mask. If the difference of the queried chrominance value from the median is larger than a preset threshold discrepancy, the queried chrominance value is preferably replaced with the median.

In another embodiment, the control unit 240 is for computing an adjacent neighbor statistic and a remote neighbor statistic of the chrominance values, and for de-color bleeding filtering the chrominance values only if the adjacent neighbor statistic is larger than a preset fraction of the remote neighbor statistic. Preferably the de-color bleeding filtering is accomplished by determining a median of those of the selected chrominance values that are encompassed by a mask, determining a difference of a queried one of the chrominance values from the determined median, and replacing the queried chrominance value with the median, if the determined difference is larger than a preset threshold discrepancy.

Figure 3:
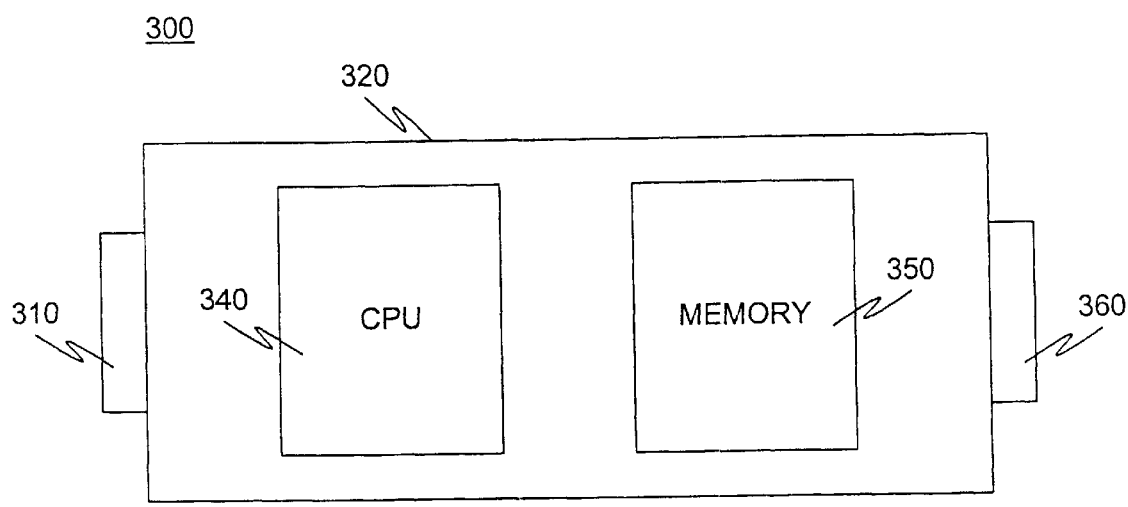
FIG. 3 is a block diagram of a processing unit according to the invention.

Referring to FIG. 3, a simplified block diagram of a processor system 300 upon which the invention can be implemented is illustrated. The input data is received through input port circuitry 310, which forwards the input data to processor 320. Processor 320 includes a Central Processing Unit (CPU) 340, which executes instructions from a memory 350 to perform the process described above to the input data, and produce the output data. The output data is exported from processor 320 through output port circuitry 360.

In both aspects of FIG. 2 and FIG. 3, the instructions stored in the respective memories 250, 350 can be part of a program, such as a computer program. The whole program, or part of the program, can alternately be stored in another machine-readable medium. Alternately, the memories 250, 350 can have dedicated structure, such as registers, for storing specific intermediate computed values.

The cost for realizing the present invention is given in terms of number of operations required in each step (the color bleeding block detection step and the median filtering step). All the operations can be implemented as integer operations (additions/subtractions, comparisons, and bit shifts) on 8-bit chrominance values. Depending on the implementation, one or two 16 bit registers may be required to hold the intermediate values.

In the detection step, there are needed about 80 additions/subtractions, 12 bit shifts and 2 comparisons for each 8×8 chrominance block. That is about 0.76 MOPS (million operations per second) for a CCIR 601, 4:2:0 video sequence.

In the filtering step, if the 7×1 median filtering mask is used, determining the median value of 7 numbers requires about 12–18 comparisons. That is about 6 to 9 MOPS for a CCIR 601, 4:2:0 video sequence, if all the chrominance pixels need to be filtered. From test sequences run in MPEG2, it was learned that less than 30% of the chrominance blocks are usually required to be filtered. That is about 1.8 to 2.7 MOPS for a CCIR 601, 4:2:0 video sequence.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments thereof as disclosed and illustrated herein are not to be considered in a limiting sense. Indeed, it should be readily apparent to those skilled in the art in view of the present description that the invention can be modified in numerous ways. The inventor regards the subject matter of the invention to include all combinations and subcombinations of the various elements, features, functions and/or properties disclosed herein. For example, the method of the invention can be practiced with fewer than all the operations that are shown in FIG. 1. Similarly, in a control system according to FIG. 2 of the invention, the control unit 240 might perform fewer than all the disclosed operations.

The following claims define certain combinations and subcombinations, which are regarded as novel and non-obvious. Additional claims for other combinations and sub-combinations of features, functions, elements and/or properties may be presented in this or a related document.

The invention claimed is:

1. A method comprising:
   selecting from a video frame a plurality of pixels containing image data representing at least a portion of an image;
   determining whether the image portion is moving; and
   if not, de-color bleeding filtering chrominance values of the image data differently than respective luminance values of the image data.

2. The method of claim 1, further comprising:
   determining whether the chrominance values meet at least one non-uniformity threshold condition, and
   wherein de-color bleeding filtering of the chrominance values is performed only if the threshold condition is met.

3. The method of claim 2, further comprising:
computing an adjacent neighbor statistic of the chrominance values; and
computing a remote neighbor statistic of the chrominance values, and
wherein the non-uniformity threshold condition is that the adjacent neighbor statistic is larger than a preset fraction of the remote neighbor statistic.

4. The method of claim 3, wherein both the adjacent neighbor statistic and the remote neighbor statistic are computed for image data of pixels neighboring only in a vertical direction.

5. The method of claim 1, wherein de-color bleeding filtering of the chrominance values is performed by:
determining a representative chrominance statistic from at least some of the chrominance values;
determining a difference of a queried one of the chrominance values from the determined chrominance statistic; and
replacing the queried chrominance value if the determined difference is larger than a preset threshold discrepancy.

6. The method of claim 5, wherein
the chrominance statistic is the median of those of the selected chrominance values that are encompassed by a mask, and
if the difference of the queried chrominance value from the median is larger than the threshold discrepancy, the queried chrominance value is replaced with the median.

7. The method of claim 1, wherein determining movement of the image portion comprises:
detecting dominant edges in luminance values of the image data; and
determining if the detected dominant edges are moving.

8. A method comprising:
selecting from a video frame a plurality of pixels containing image data representing at least a portion of an image;
determining whether chrominance values of the image data stored in the selected pixels collectively meet at least one non-uniformity threshold condition; and
only if they do, de-color bleeding filtering the chrominance values differently than respective luminance values of the image data.

9. The method of claim 8, further comprising:
computing an adjacent neighbor statistic of the chrominance values, and
wherein the non-uniformity threshold condition is that the computed adjacent neighbor statistic is larger than a preset threshold.

10. The method of claim 8, further comprising:
computing an adjacent neighbor statistic of the chrominance values; and
computing a remote neighbor statistic of the chrominance values, and
wherein the non-uniformity threshold condition is that the computed adjacent neighbor statistic is larger than a preset fraction of the computed remote neighbor statistic.

11. The method of claim 10, wherein both the adjacent neighbor statistic and the remote neighbor statistic are computed for image data of pixels neighboring only in a vertical direction.

12. The method of claim 8, wherein de-color bleeding filtering of the chrominance values is performed by:
determining a representative chrominance statistic from at least some of the chrominance values;
determining a difference of a queried one of the chrominance values from the determined chrominance statistic; and
replacing the queried chrominance value if the determined difference is larger than a preset threshold discrepancy.

13. The method of claim 12, wherein
the chrominance statistic is the median of those of the selected chrominance values that are encompassed by a mask, and
if the difference of the queried chrominance value from the median is larger than the threshold discrepancy, the queried chrominance value is replaced with the median.

14. The method of claim 8, further comprising:
determining whether the image portion is moving; and
if so, then not de-color bleeding filtering the chrominance values of the image data.

15. A system comprising:
a buffer for receiving image data representing at least a portion of an image; and
a control unit coupled with the buffer for determining whether the image portion is moving and, if not, for de-color bleeding filtering chrominance values of the image data differently than respective luminance values of the image data.

16. The system of claim 15, wherein the control unit is for determining whether the chrominance values meet at least one non-uniformity threshold condition, and for de-color bleeding filtering the chrominance values only if the non-uniformity threshold condition is met.

17. The system of claim 16, wherein the non-uniformity threshold condition is that an adjacent neighbor statistic of the chrominance values is larger than a preset threshold.

18. The system of claim 16, wherein the non-uniformity threshold condition is that an adjacent neighbor statistic of the chrominance values is larger than a preset fraction of a remote neighbor statistic of the chrominance values.

19. The system of claim 18, wherein both the adjacent neighbor statistic and the remote neighbor statistic are for image data of pixels neighboring only in a vertical direction.

20. The system of claim 15, wherein the control unit is for de-color bleeding filtering the chrominance values by determining a representative chrominance statistic from at least some of the chrominance values, determining a difference of a queried one of the chrominance values from the determined chrominance statistic, and replacing the queried chrominance value if the determined difference is larger than a preset threshold discrepancy.

21. The system of claim 20, wherein
the chrominance statistic is the median of those of the selected chrominance values that are encompassed by a mask, and
if the difference of the queried chrominance value from the median is larger than the threshold discrepancy, the queried chrominance value is replaced with the median.

22. A system comprising:
a buffer for receiving image data representing at least a portion of an image, the image data having respective chrominance values; and
a control unit coupled with the buffer for computing an adjacent neighbor statistic and a remote neighbor sta tistic of the chrominance values and for de-color bleeding filtering the chrominance values only if the adjacent neighbor statistic is larger than a preset fraction of the remote neighbor statistic, wherein de-color bleeding filtering the chrominance values is by determining a median of those of the selected chrominance values that are encompassed by a mask, determining a difference of a queried one of the chrominance values from the determined median, and replacing the queried chrominance value with the median if the determined difference is larger than a preset threshold discrepancy.

\* \* \* \* \*